(12) United States Patent
Zhao et al.

(10) Patent No.: US 7,242,540 B1
(45) Date of Patent: Jul. 10, 2007

(54) AXIS-ADJUSTABLE OPTICAL DEVICE AND OPTICAL INSTRUMENT UTILIZING THE SAME

(75) Inventors: Lian Zhao, Hang-Zhou (CN); Hua-Tang Liu, Taichung (TW)

(73) Assignee: Asia Optical Co., Inc. (TW)

( * ) Notice: Subject to any disclaimer, the term of this patent is extended or adjusted under 35 U.S.C. 154(b) by 0 days.

(21) Appl. No.: 11/557,656

(22) Filed: Nov. 8, 2006

(30) Foreign Application Priority Data
Dec. 23, 2005 (TW) .............................. 94146181 A (51) Int. Cl.
*G02B 7/02* (2006.01)
(52) U.S. Cl. ..................... 359/819; 359/821; 359/822; 359/826
(58) Field of Classification Search ................ 359/811, 359/813, 819, 821, 822, 823, 826, 827
See application file for complete search history.

(56) References Cited

U.S. PATENT DOCUMENTS

2005/0237636 A1* 10/2005 Bedzyk ..................... 359/819

* cited by examiner

*Primary Examiner*—Timothy Thompson
(74) *Attorney, Agent, or Firm*—Banner & Witcoff, Ltd.

(57) ABSTRACT

An axis-adjustable optical device includes: a base; a first adjustment unit including a biasing component disposed between a support seat and the base, and a plurality of screw fasteners for coupling the support seat to the base; a second adjustment unit including a guide hoop coupled and pivotable relative to a pivot seat on the support seat; and a lens unit including a barrel that defines an optical axis, and that has a first segment having a universal coupling relation with a holding seat on the support seat, and a second segment having the guide hoop sleeved thereon. Pivotal movement of the guide hoop relative to the pivot seat drives movement of the barrel to adjust the optical axis.

14 Claims, 12 Drawing Sheets

AXIS-ADJUSTABLE OPTICAL DEVICE AND OPTICAL INSTRUMENT UTILIZING THE SAME

CROSS-REFERENCE TO RELATED APPLICATION

This application claims priority of Taiwanese Application No. 094146181, filed on Dec. 23, 2005.

BACKGROUND OF THE INVENTION

1. Field of the Invention

The invention relates to an optical instrument, more particularly to an optical instrument including an axis-adjustable optical device.

2. Description of the Related Art

Figure 1:
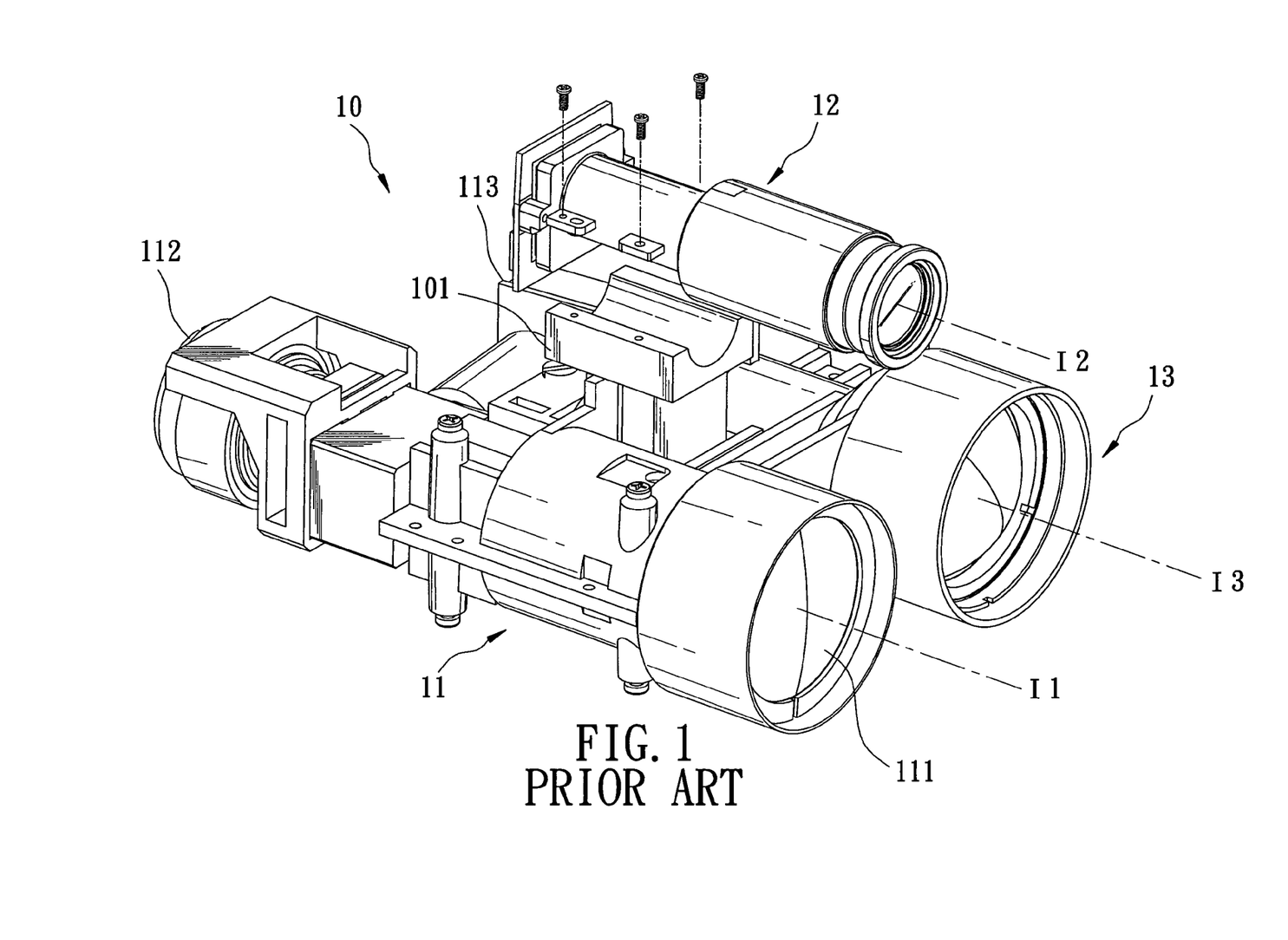
FIG. 1 is an assembled perspective view of a conventional telescope.

As shown in FIG. 1, a conventional telescope is an optical instrument that incorporates both digital recording and distance measuring functions. The conventional telescope includes a main body 10, and first, second and third optical devices 11, 12, 13.

The main body 10 includes a mounting seat 101 that extends upwardly.

The first optical device 11 has telescopic and laser-emitting functions. The first optical device 11 is coupled to the main body 10, and has a first optical axis (I1). The first optical device 11 includes a first objective lens unit 111 to be disposed to confront a target object, a first ocular lens unit 112 disposed opposite to the first objective lens unit 111, and a laser-emitting module 113 disposed adjacent to the first ocular lens unit 112.

The second optical device 12 is capable of sensing images and converting the images sensed thereby into digital signals. In other words, the second optical device 12 has image capturing functionality. The second optical device 12 is mounted to the mounting seat 101 of the main body 10, and has a second optical axis (I2).

The third optical device 13 has laser reception capability. The third optical device 13 is coupled to the main body 10, and has a third optical axis (I3). In particular, the laser emitted by the first optical device 11 is reflected by the target object. The reflected laser is received by the third optical device 13 in order to calculate the distance between the target object and an observation site at which the conventional telescope is located.

Since the first optical device 11 has telescopic and laser-emitting functions, the second optical device 12 is capable of sensing the image of the target object and converting the image into its corresponding digital signals, while the third optical device 13 is capable of receiving the laser reflected by the target object, the first, second and third optical axes (I1), (I2), (I3) are required to be parallel to each other such that the first, second and third optical devices 11, 12, 13 have the same angles of incidence with the target object and so as to avoid offsets. Therefore, in order to acquire accurate and consistent observations, image capturing, and distance measurements related to the target object, the conventional telescope requires axis adjustments prior to being released from the factory.

However, during actual manufacturing and axis adjustment processes, the following problems are encountered due to the structure of the conventional telescope, especially with the second optical device 12:

Lots of uncertainties are present during the manufacturing and assembly process of the conventional telescope, such as manufacturing tolerances in the mounting seat 101 and the second optical device 12, and displacement offsets between the mounting seat 101 and the second optical device 12 that occur during coupling, etc. These can affect the parallel relation of the second optical axis (I2) with the first and third optical axes (I1), (I3).

Since the mounting seat 101 is fixed on the main body 10, and since the second optical device 12 is mounted to the mounting seat 101, it is difficult to perform axis adjustments. In addition, after the second optical device 12 has been mounted to the mounting seat 101, it is required to dismount the second optical device 12 from the mounting seat 101 if the first, second and third optical axes (I1), (I2), (I3) are not parallel in order to repeat the axis adjustment process, which is inconvenient and time-consuming.

SUMMARY OF THE INVENTION

Therefore, the main object of the present invention is to provide an optical device that facilitates axis adjustments.

Another object of the present invention is to provide an optical instrument that includes an axis-adjustable optical device.

According to one aspect of the present invention, there is provided an axis-adjustable optical device that includes a base, first and second adjustment units, and a lens unit.

The base has a mounting surface. The mounting surface extends in first and second directions that are perpendicular to each other.

The first adjustment unit includes a support seat, at least one biasing component disposed between the support seat and the mounting surface of the base, and a plurality of screw fasteners each extending in a third direction perpendicular to the first and second directions for coupling the support seat to the base.

The second adjustment unit includes a holding seat and a pivot seat that are coupled to the support seat and that are spaced apart from each other in the first direction, and a guide hoop that is coupled to the pivot seat and that is pivotable relative to the pivot seat about the first direction.

The lens unit includes a barrel that extends in the first direction, and that defines an optical axis. The barrel has a first segment, and a second segment extending from the first segment. The first segment has a universal coupling relation with the holding seat of the second adjustment unit. The second segment has the guide hoop sleeved thereon. Pivotal movement of the guide hoop relative to the pivot seat drives movement of the barrel such that the optical axis is adjusted in the second and third directions.

According to another aspect of the present invention, there is provided an optical instrument that includes a main body, a lens device, and an axis-adjustable optical device. The lens device is coupled to the main body and has an optical axis that extends in a first direction. The axis-adjustable optical device includes a base, first and second adjustment units, and a lens unit.

The base is secured to the main body, and has a mounting surface. The mounting surface extends in the first direction and a second direction that is perpendicular to the first direction.

The first adjustment unit includes a support seat, at least one biasing component disposed between the support seat and the mounting surface of the base, and a plurality of screw fasteners each extending in a third direction perpendicular to the first and second directions for coupling the support seat to the base.

The second adjustment unit includes a holding seat and a pivot seat that are coupled to the support seat and that are spaced apart from each other in the first direction, and a guide hoop that is coupled to the pivot seat and that is pivotable relative to the pivot seat about the first direction.

The lens unit includes a barrel that extends in the first direction, that defines an adjustable optical axis, and that has a first segment and a second segment extending from the first segment. The first segment has a universal coupling relation with the holding seat of the second adjustment unit. The second segment has the guide hoop sleeved thereon. Pivotal movement of the guide hoop relative to the pivot seat drives movement of the barrel such that the adjustable optical axis is adjusted in the second and third directions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
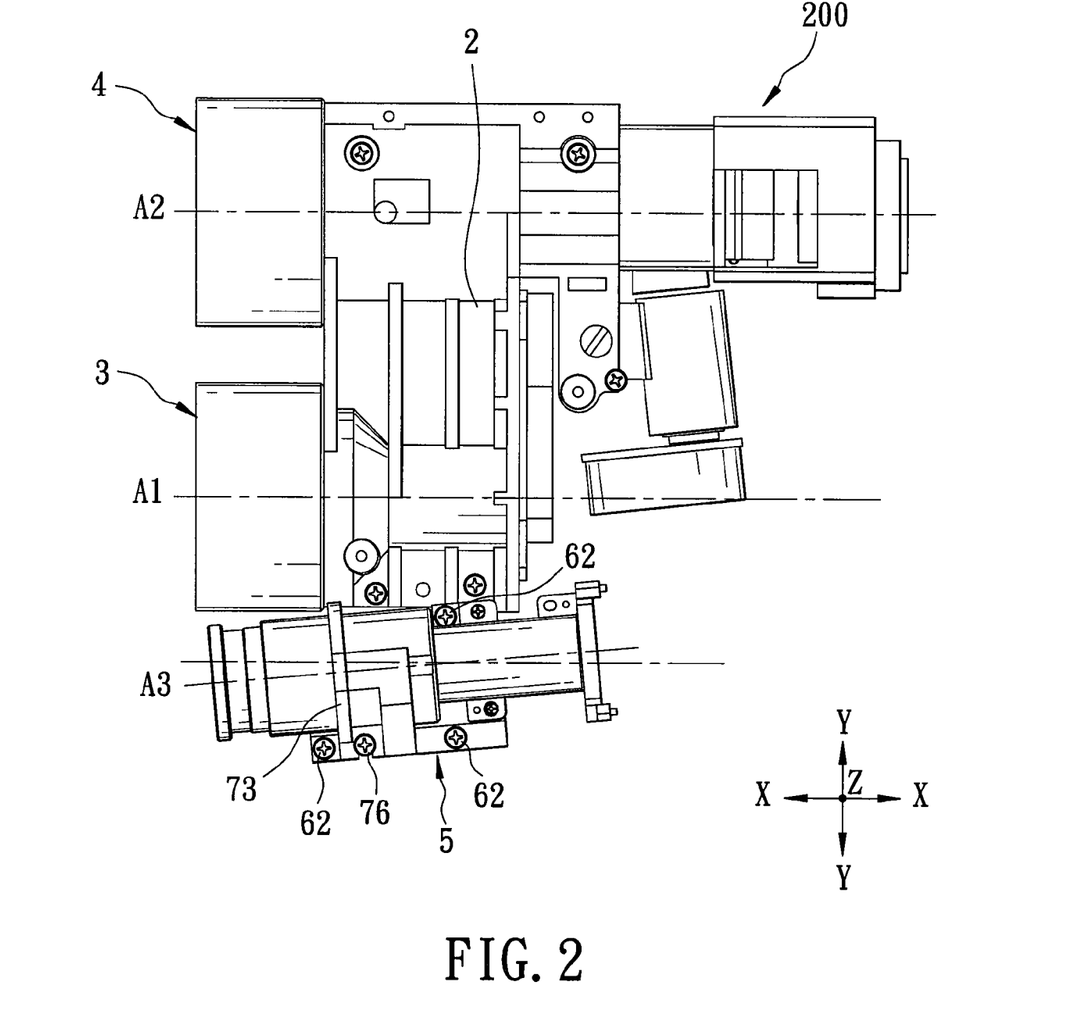
FIG. 2 is a top view of the preferred embodiment of an optical instrument according to the present invention, illustrating an axis-adjustable optical device prior to axis adjustment, where an adjustable optical axis is not parallel to first and second optical axes.
Figure 3:
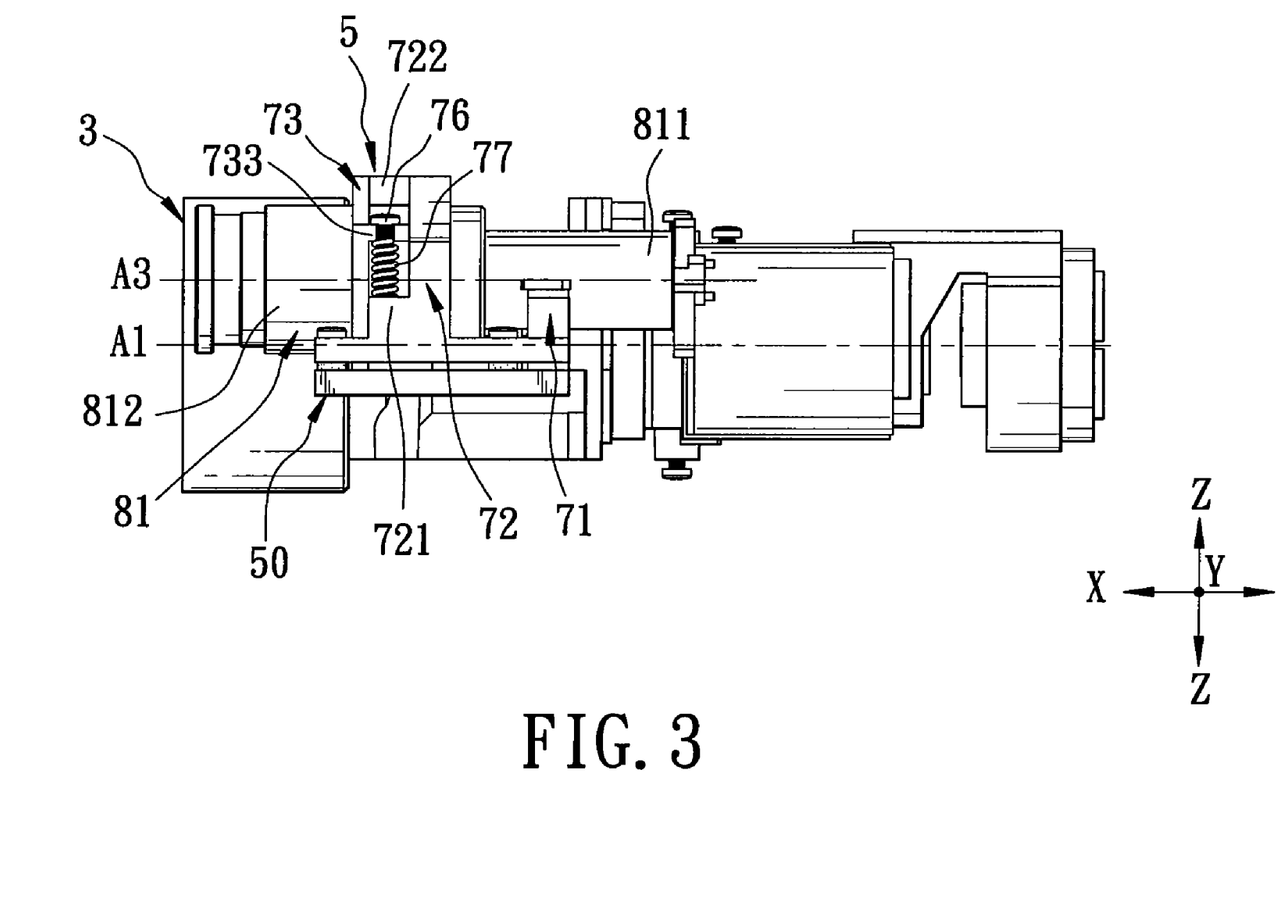
FIG. 3 is a side view of the preferred embodiment corresponding to FIG. 2.

As shown in FIG. 2 and FIG. 3, the preferred embodiment of an optical instrument 200 according to the present invention includes a main body 2, first and second lens devices 3, 4, and an axis-adjustable optical device 5. As with the prior art, the optical instrument 200 has observing, digital recording and distance measuring functions.

The first lens device 3 is coupled to the main body 2, and has a first optical axis (A1) that extends in a first direction (X).

The second lens device 4 is coupled to the main body 2, and is disposed substantially parallel to the first lens device 3. The second lens device 4 has a second optical axis (A2) that extends in the first direction (X).

Figure 4:
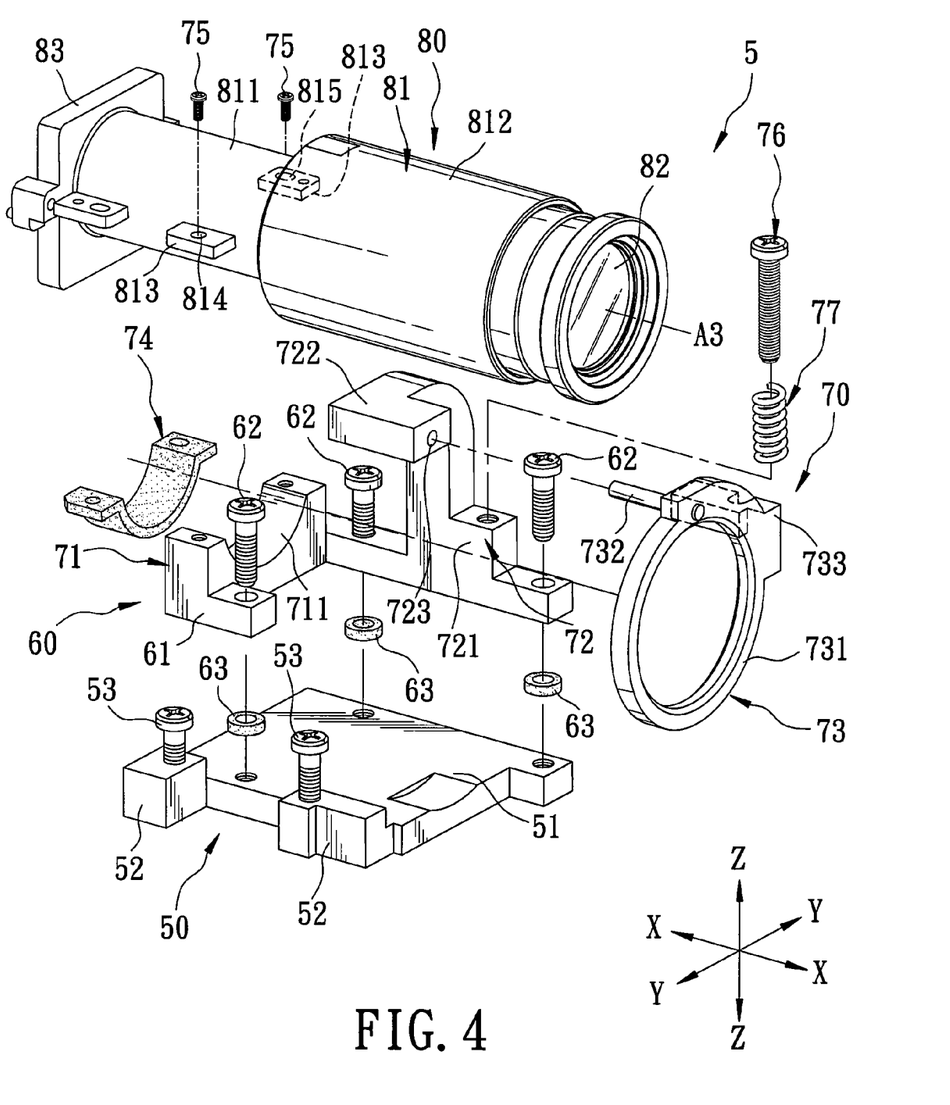
FIG. 4 is an exploded perspective view of an axis-adjustable optical device according to the preferred embodiment.
Figure 5:
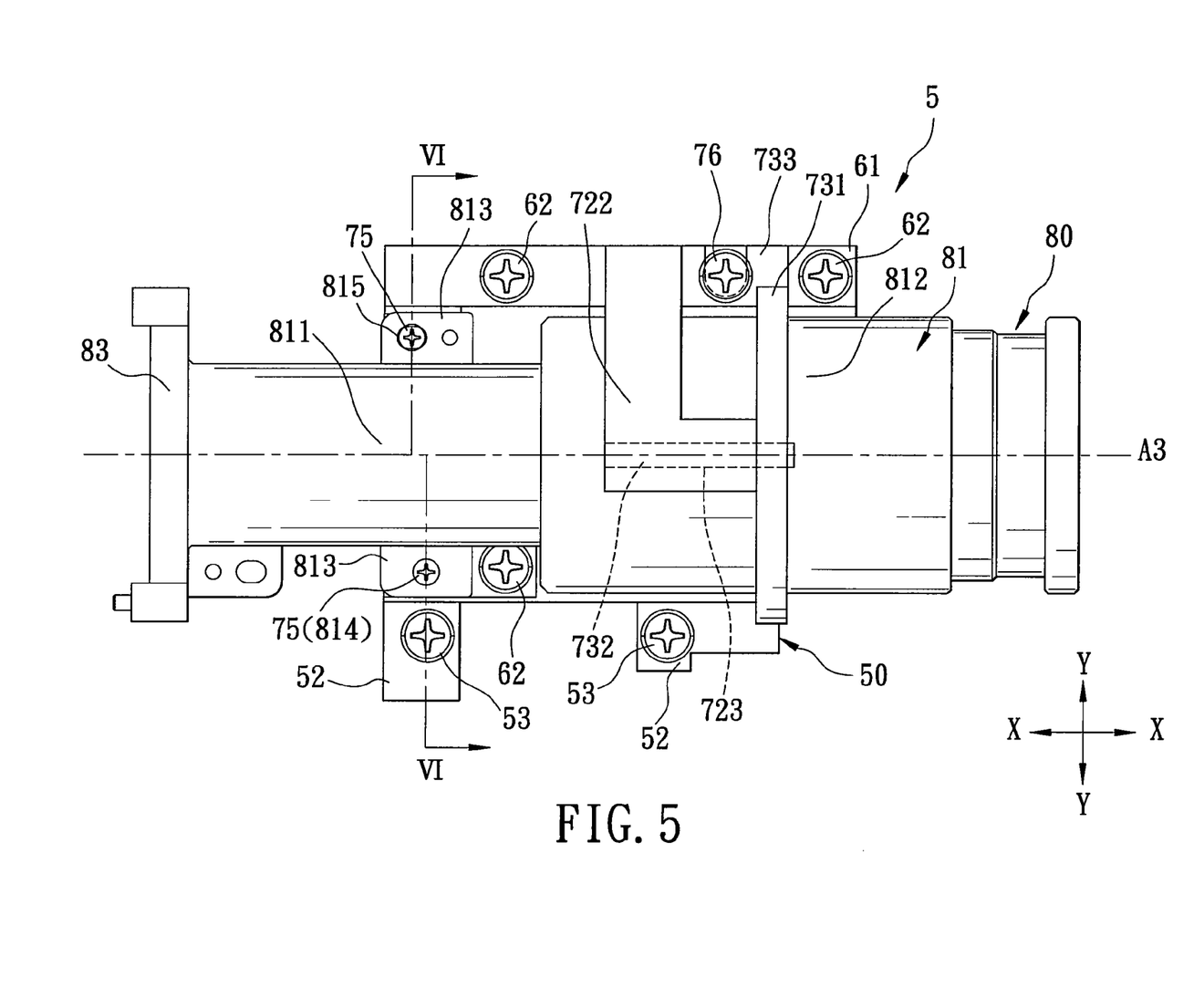
FIG. 5 is a top view of the axis-adjustable optical device.
Figure 6:
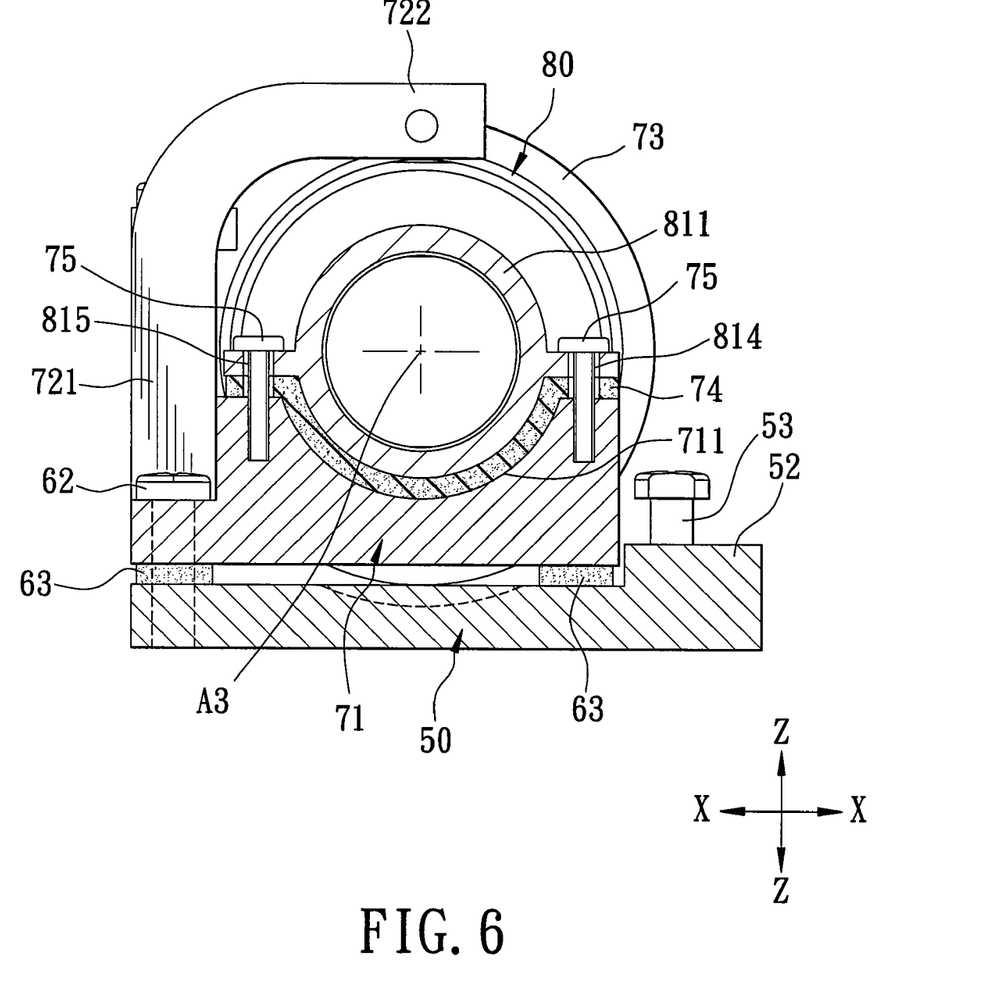
FIG. 6 is an assembled sectional view of the axis-adjustable optical device.

As shown in FIGS. 4, 5 and 6, the axis-adjustable optical device 5 includes a base 50, first and second adjustment units 60, 70, and a lens unit 80.

Figure 7:
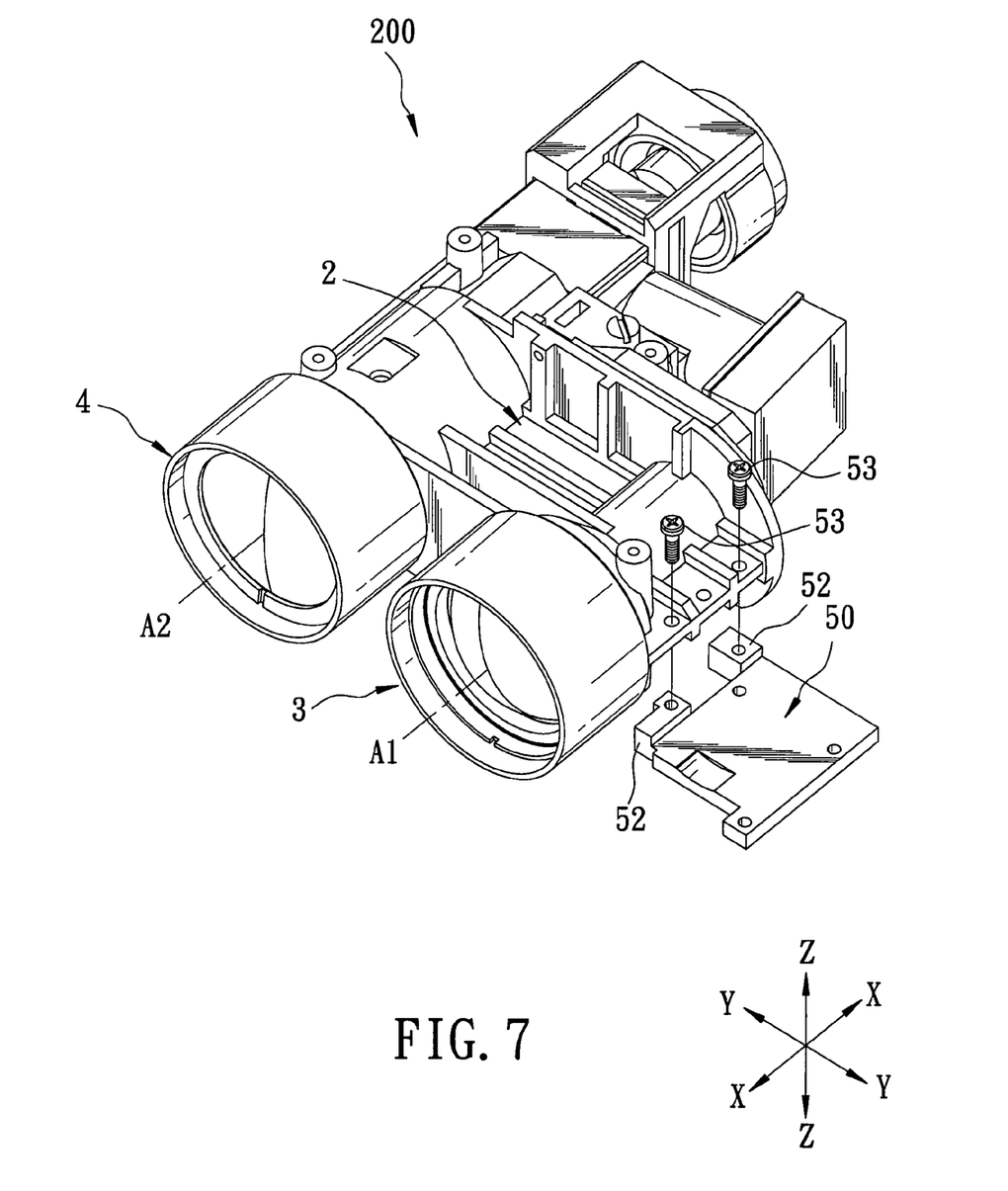
FIG. 7 is a partly-exploded perspective view of the preferred embodiment, illustrating a base of the axis-adjustable optical device to be coupled to a main body.

The base 50 has a mounting surface 51, and includes two mounting blocks 52 connected to one side of the mounting surface 51 and spaced apart from each other. The mounting surface 51 extends in the first direction (X) and a second direction (Y) that is perpendicular to the first direction (X). As shown in FIG. 7, the base 50 is disposed adjacent to the first lens device 3, and is mounted to the main body 2 by coupling the mounting blocks 52 to the main body 2 via screw fasteners 53. In addition, the base 50 projects from the main body 2 in the second direction (Y). It should be noted herein that although the base 50 and the main body 2 are two separate components in this embodiment, they may be formed integrally in other embodiments of the present invention.

The first adjustment unit 60 includes a support seat 61, at least one first biasing component 63 disposed between the support seat 61 and the mounting surface 51 of the base 50, and a plurality of first screw fasteners 62 each extending in a third direction (Z) perpendicular to the first and second directions (X), (Y) for coupling the support seat 61 to the base 50.

In particular, the first adjustment unit 60 includes three of the first screw fasteners 62 in this embodiment. A first pair of the first screw fasteners 62 are aligned in the first direction (X), and a second pair of the first screw fasteners 62 are aligned in the second direction (Y). In addition, the first adjustment unit 60 includes three of the first biasing components 63, each of which has a respective one of the first screw fasteners 62 extending therethrough.

In this embodiment, each of the first biasing components 63 is a resilient washer, but it can also be replaced with a compression spring (not shown) or a resilient pad (not shown) in other embodiments of the present invention. In addition, it is not necessary for the first screw fasteners 62 to extend through the first biasing components 63.

The second adjustment unit 70 includes a holding seat 71 and a pivot seat 72 that are coupled to the support seat 61 and that are spaced apart from each other in the first direction (X), and a guide hoop 73 that is coupled to the pivot seat 72 and that is pivotable relative to the pivot seat 72 about the first direction (X).

In particular, the holding seat 71 extends from the support seat 61 in the third direction (Z), and is formed with a curved notch 711.

The pivot seat 72 includes an extension segment 721 extending from the support seat 61 of the first adjustment unit 60 in the third direction (Z), and a suspension segment 722 extending from the extension segment 721 in the second direction (Y). The suspension segment 722 is aligned with the holding seat 71 in the first direction (X), and is formed with an axle hole 723 that extends in the first direction (X).

The guide hoop 73 includes a hoop part 731, and an axle 732 that extends from the hoop part 731 in the first direction (X) and that is received in the axle hole 723 such that the hoop part 731 is pivotable relative to the suspension segment 722 of the pivot seat 72. The guide hoop 73 further includes a pivot ear 733 projecting from the hoop part 731.

The second adjustment unit 70 further includes a second biasing component 77 disposed between the pivot ear 733 and the extension segment 721 of the pivot seat 72, and a second screw fastener 76 extending in the third direction (Z) sequentially through a notch in the pivot ear 733 and the second biasing component 77, and engaging threadedly the extension segment 721. In this embodiment, the second biasing component 77 is a compression spring.

The lens unit 80 includes a barrel 81 that extends in the first direction (X), a lens part 82 received in the barrel 81, and an image sensor 83 coupled to a rear end of the barrel 81. The barrel 81 defines an adjustable optical axis (A3), and has a first segment 811 and a second segment 812 extending from the first segment 811. The second segment 712 has the guide hoop 73 sleeved thereon.

The second adjustment unit 70 further includes a resilient pad 74 disposed in the curved notch 711 and clamped between the holding seat 71 and the first segment 811 of the barrel 81.

Moreover, the lens unit 80 further includes two wing plates 813 respectively provided on two sides of the first segment 811 of the barrel 81 and extending in the second direction (Y). One of the wing plates 813 is formed with a circular hole 814, while the other one of the wing plates 813 is formed with an elongated hole 815.

The second adjustment unit 70 further includes two screws 75 respectively extending through the circular and elongated holes 814, 815, and engaging threadedly the holding seat 71.

Because the resilient pad 74, which is clamped between the holding seat 71 and the first segment 811 of the barrel 81 is compressible, the barrel 81 is allowed to move slightly in the third direction (Z). In addition, since one of the wing plates 813 is coupled to the holding seat 71 via the circular hole 814, while the other one of the wing plates 813 is coupled to the holding seat 71 via the elongated hole 815, the barrel 81 is allowed to pivot slightly relative to the screw 75 that extends through the circular hole 814. As a result, the first segment 811 of the barrel has a universal coupling relation with the holding seat 71 of the second adjustment unit 70.

The principles behind the adjustment of the adjustable optical axis (A3) are explained in further detail below.

While the second biasing member 77 urges against the pivot ear 733 such that a biasing force is exerted upwardly on the pivot ear 733 (as shown in FIG. 3), the guide hoop 73 is pivotable relative to the suspension segment 722 of the pivot seat 72 in the first direction (X) when depth of threaded engagement between the second screw fastener 76 and the extension segment 721 of the pivot seat 72 is varied. At the same time, since the first segment 811 of the barrel 81 has a universal coupling relation with the holding seat 71 of the second adjustment unit 70, pivotal movement of the guide hoop 73 relative to the pivot seat 72 drives movement of the barrel 81 such that the adjustable optical axis (A3) is adjusted in the second and third directions (Y), (Z). Simultaneously, the adjustable optical axis (A3) is also adjusted tiltably about the first direction (X). In addition, by adjusting depths of threaded engagement between the first screw fasteners 62 and the base 50, the adjustable optical axis (A3) can be further adjusted tiltably about the first direction (X).

Figure 8:
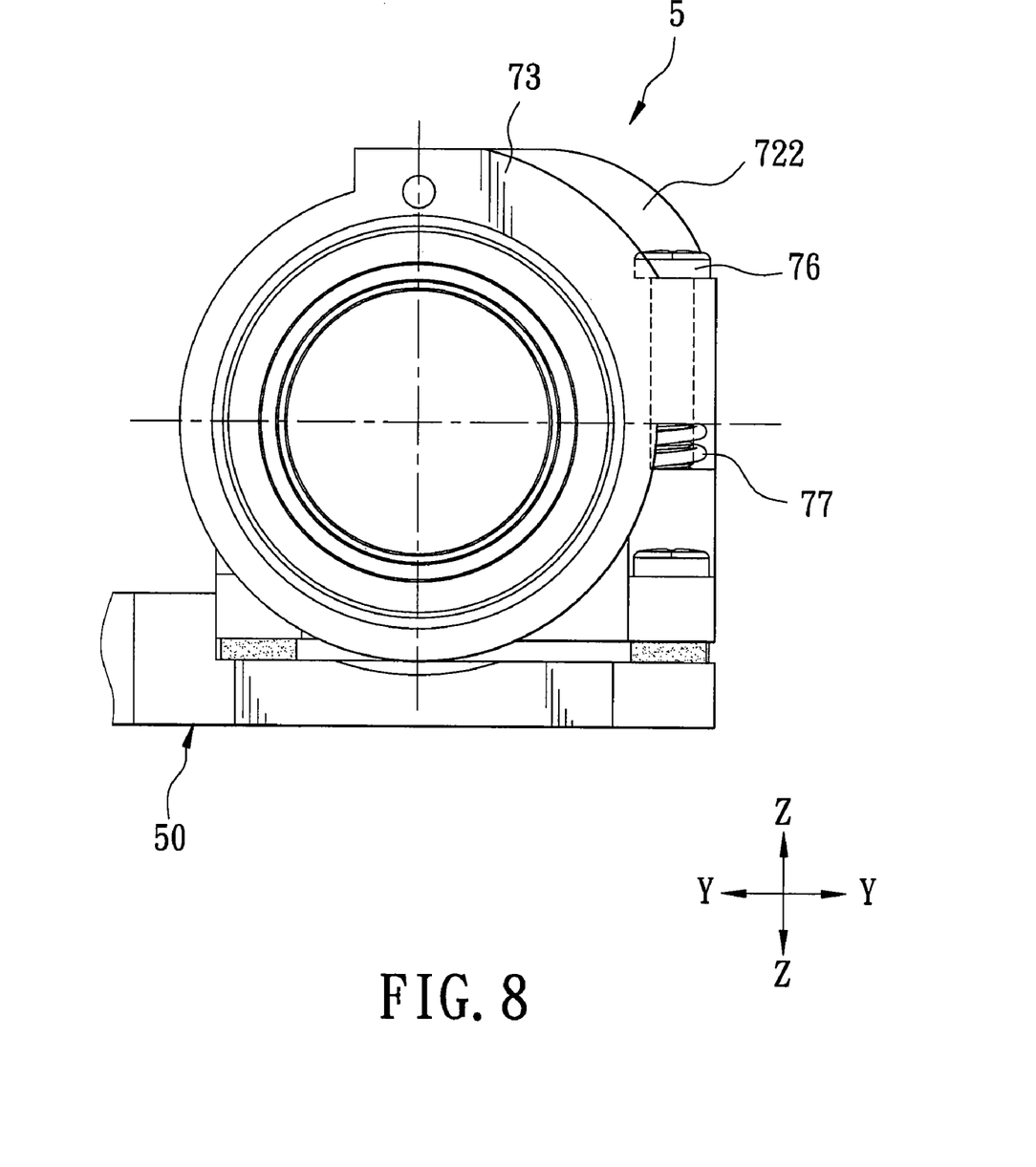
FIG. 8 is a schematic view of the axis-adjustable optical device corresponding to FIG. 2 and FIG. 3, illustrating the axis-adjustable optical device prior to axis adjustment.
Figure 9:
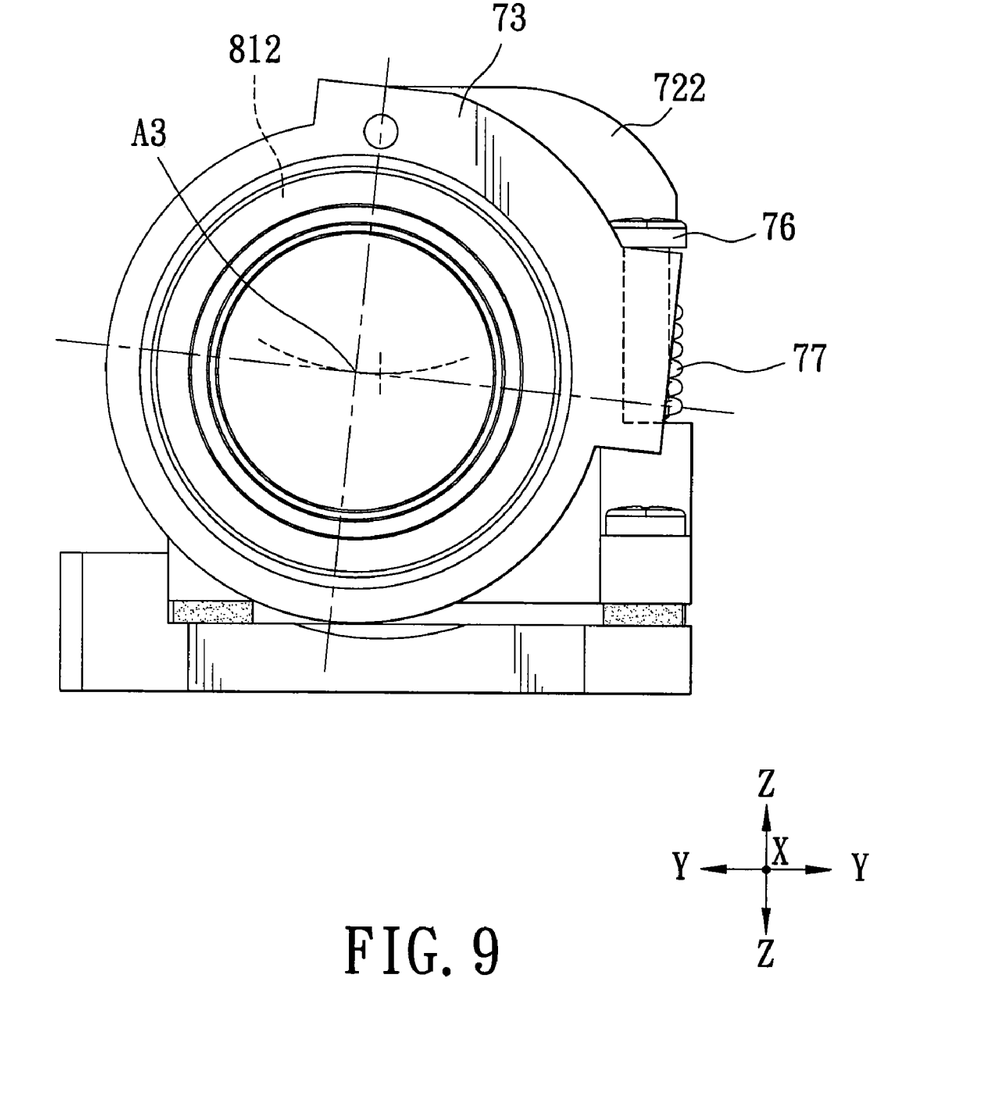
FIG. 9 is a schematic view similar to FIG. 8, illustrating pivotal movement of a guide hoop relative to a pivot seat for adjusting the adjustable optical axis.
Figure 10:
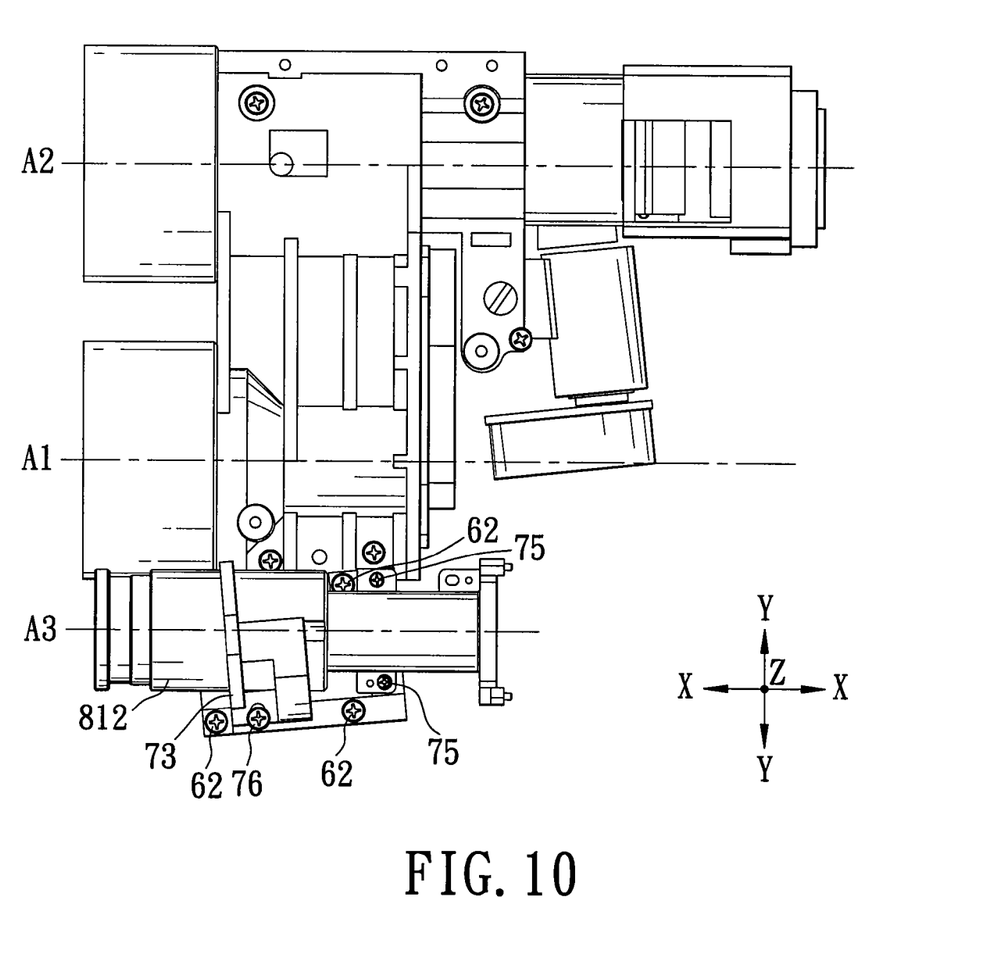
FIG. 10 is a top view of the preferred embodiment corresponding to FIG. 9, illustrating the adjustable optical axis parallel to the first and second optical axes in the first direction when observing in the third direction.

An example is presented hereinbelow to illustrate the mechanism of axis adjustment of the present invention. Referring to FIGS. 2, 3 and 8, after the axis-adjustable optical device 5 is coupled to the main body 2, if the adjustable optical axis (A3) is not parallel to the first and second optical axes (A1), (A2), the following steps can be taken to perform axis adjustment:

As shown in FIG. 2 and observing in the third direction (Z), the adjustable optical axis (A3) is slightly off parallel from the first and second optical axes (A1), (A2) in the first direction (X). To be more precise, the adjustable optical axis (A3) is slightly tilted about the third direction (Z) relative to the first and second optical axes (A1), (A2). To make the adjustable optical axis (A3) parallel to the first and second optical axes (A1), (A2), a user (not shown) only needs to increase the depth of the threaded engagement between the second screw fastener 76 and the extension segment 721 of the pivot seat 72 (as shown in FIG. 5). Consequently, as shown in FIG. 9, the guide hoop 73 is pivoted relative to the suspension segment 722 about the first direction (X) toward the top left hand corner of FIG. 9, thereby adjusting the adjustable optical axis (A3) toward the top left hand corner of FIG. 9. Accordingly, as shown in FIG. 10, which corresponds to FIG. 9, the adjustable optical axis (A3) is made parallel to the first and second optical axes (A1), (A2) in the first direction (X) when observing in the third direction (Z).

Figure 11:
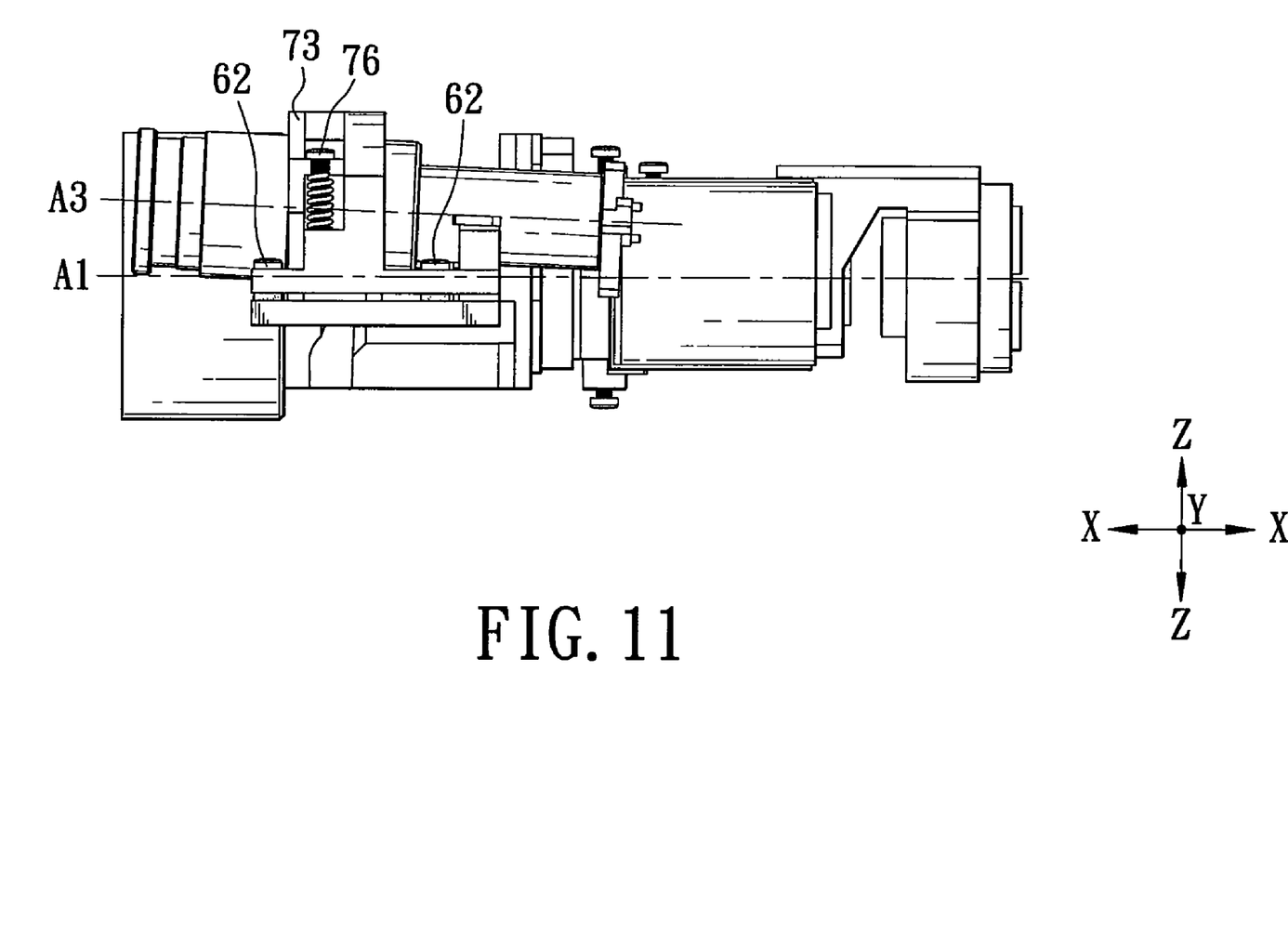
FIG. 11 is a side view of the preferred embodiment corresponding to FIG. 10, illustrating the adjustable optical axis is slightly tilted about the second direction (Y) relative to the first and second optical axes.
Figure 12:
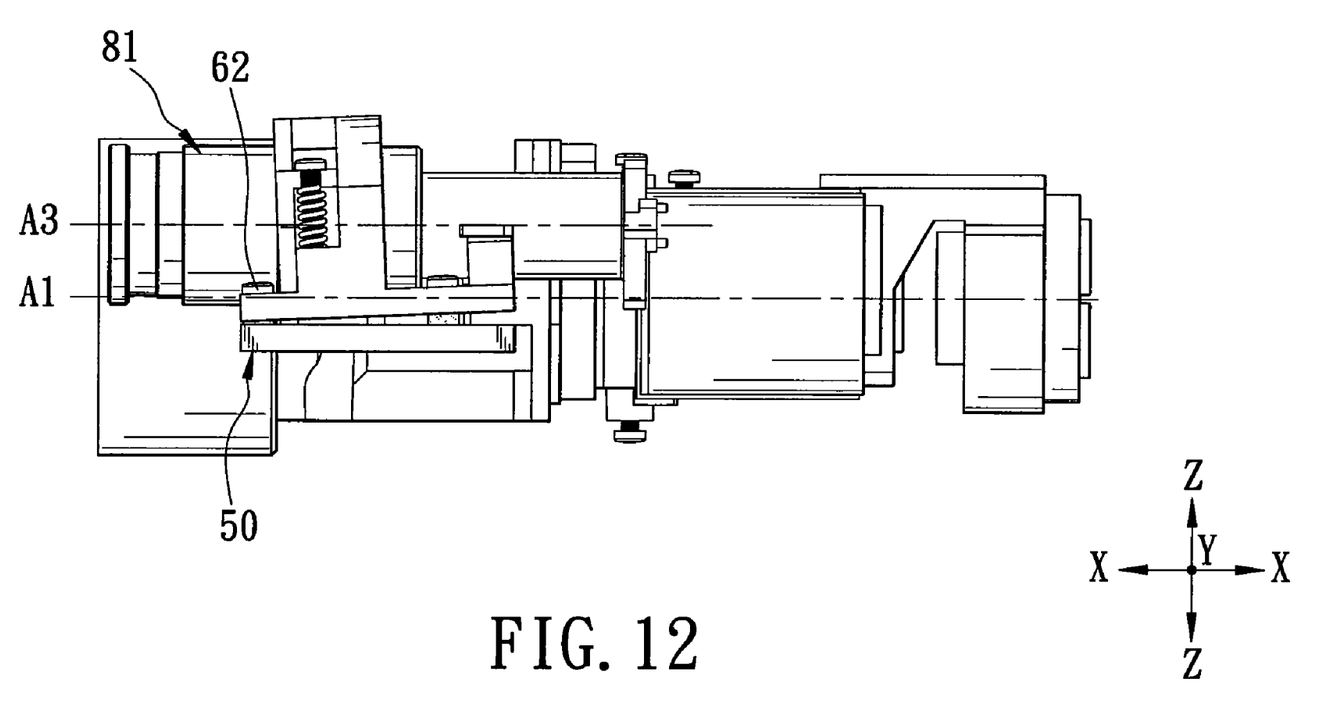
FIG. 12 is a side view similar to FIG. 11, illustrating the adjustable optical axis parallel to the first and second optical axes in the first direction when observing in the second direction.

As shown in FIG. 9, the pivotal movement of the guide hoop 73 relative to the suspension segment 722 also provides an upward movement for the second segment 812 of the barrel 81 (as shown in FIG. 5) in the third direction (Z), resulting in a corresponding upward movement of the adjustable optical axis (A3) in the third direction (Z). This can be seen in FIG. 11 and observing in the second direction (Y), the adjustable optical axis (A3) is slightly still off parallel from the first optical axis (A1) in the first direction (X). But this time, the adjustable optical axis (A3) is slightly tilted about the second direction (Y) relative to the first and second optical axes (A1), (A2). As shown in FIG. 12, the depths of the threaded engagement between the first screw fasteners 62 and the base 50 are adjusted so as to tilt the barrel 81 about the second direction (Y) until the adjustable optical axis (A3) is parallel to the first optical axis (A1) in the first direction (X) when observing in the second direction (Y).

After conducting the above two steps, the adjustable optical axis (A3) is parallel to the first and second optical axes (A1), (A2). Therefore, the time taken to conduct the axis adjustments before the optical instrument 200 of the present invention comes out of the factory can be shortened as compared to the prior art. In addition, the steps taken to adjust the adjustable optical axis (A3) are easy to perform, effective, and highly precise.

It should be noted herein that the axis-adjustable optical device 5 is not limited for use in a telescope, and can also be used in other optical instruments such as a laser distance measuring apparatus.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An axis-adjustable optical device comprising:
   a base having a mounting surface, said mounting surface extending in first and second directions that are perpendicular to each other;
   a first adjustment unit including a support seat, at least one first biasing component disposed between said support seat and said mounting surface of said base, and a plurality of first screw fasteners each extending in a third direction perpendicular to the first and second directions for coupling said support seat to said base;

a second adjustment unit including a holding seat and a pivot seat that are coupled to said support seat and that are spaced apart from each other in the first direction, and a guide hoop that is coupled to said pivot seat and that is pivotable relative to said pivot seat about the first direction; and a lens unit including a barrel that extends in the first direction, that defines an optical axis, and that has a first segment and a second segment extending from said first segment, said first segment having a universal coupling relation with said holding seat of said second adjustment unit, said second segment having said guide hoop sleeved thereon;

wherein pivotal movement of said guide hoop relative to said pivot seat drives movement of said barrel such that the optical axis is adjusted in the second and third directions.

2. The axis-adjustable optical device as claimed in claim 1, wherein said first adjustment unit includes three of said first screw fasteners, a first pair of which being aligned in the first direction, and a second pair of which being aligned in the second direction.

3. The axis-adjustable optical device as claimed in claim 2, wherein said first adjustment unit includes three of said first biasing components, each of which is a resilient washer and has a respective one of said first screw fasteners extending therethrough.

4. The axis-adjustable optical device as claimed in claim 1, wherein:

said holding seat of said second adjustment unit extends from said support seat of said first adjustment unit in the third direction, and is formed with a curved notch;

said lens unit further includes two wing plates respectively provided on two sides of said first segment of said barrel and extending in the second direction, one of said wing plates being formed with a circular hole, the other one of said wing plates being formed with an elongated hole; and said second adjustment unit further includes a resilient pad disposed in said curved notch and clamped between said holding seat and said first segment of said barrel, and two screws respectively extending through said circular and elongated holes, and engaging threadedly said holding seat.

5. The axis-adjustable optical device as claimed in claim 1, wherein said pivot seat of said second adjustment unit includes an extension segment extending from said support seat of said first adjustment unit in the third direction, and a suspension segment extending from said extension segment in the second direction and formed with an axle hole that extends in the first direction, said guide hoop including a hoop part, and an axle that extends from said hoop part in the first direction and that is received in said axle hole such that said hoop part is pivotable relative to said suspension segment.

6. The axis-adjustable optical device as claimed in claim 5, wherein said guide hoop further includes a pivot ear projecting from said hoop part, said second adjustment unit further including a second biasing component disposed between said pivot ear and said extension segment of said pivot seat of said second adjustment unit, and a second screw fastener extending in the third direction sequentially through said pivot ear and said second biasing component, and engaging threadedly said extension segment.

7. An optical instrument comprising:

a main body;

a first lens device coupled to said main body and having a first optical axis that extends in a first direction; and an axis-adjustable optical device including:

a base secured to said main body and having a mounting surface, said mounting surface extending in the first direction and a second direction that is perpendicular to the first direction;

a first adjustment unit including a support seat, at least one first biasing component disposed between said support seat and said mounting surface of said base, and a plurality of first screw fasteners each extending in a third direction perpendicular to the first and second directions for coupling said support seat to said base;

a second adjustment unit including a holding seat and a pivot seat that are coupled to said support seat and that are spaced apart from each other in the first direction, and a guide hoop that is coupled to said pivot seat and that is pivotable relative to said pivot seat about the first direction; and a lens unit including a barrel that extends in the first direction, that defines an adjustable optical axis, and that has a first segment and a second segment extending from said first segment, said first segment having a universal coupling relation with said holding seat of said second adjustment unit, said second segment having said guide hoop sleeved thereon;

wherein pivotal movement of said guide hoop relative to said pivot seat drives movement of said barrel such that the adjustable optical axis is adjusted in the second and third directions.

8. The optical instrument as claimed in claim 7, further comprising a second lens device coupled to said main body, disposed parallel to said first lens device, and having a second optical axis that extends in the first direction.

9. The optical instrument as claimed in claim 7, wherein said axis-adjustable optical device is disposed adjacent to said first lens device, and projects from said main body in the second direction.

10. The optical instrument as claimed in claim 7, wherein said first adjustment unit of said axis-adjustable optical device includes three of said first screw fasteners, a first pair of which being aligned in the first direction, and a second pair of which being aligned in the second direction.

11. The optical instrument as claimed in claim 10, wherein said first adjustment unit of said axis-adjustable optical device includes three of said first biasing components, each of which is a resilient washer and has a respective one of said first screw fasteners extending therethrough.

12. The optical instrument as claimed in claim 7, wherein:

said holding seat of said second adjustment unit of said axis-adjustable optical device extends from said support seat of said first adjustment unit in the third direction, and is formed with a curved notch;

said lens unit of said axis-adjustable optical device further includes two wing plates respectively provided on two sides of said first segment of said barrel and extending in the second direction, one of said wing plates being formed with a circular hole, the other one of said wing plates being formed with an elongated hole; and said second adjustment unit of said axis-adjustable optical device further includes a resilient pad disposed in said curved notch and clamped between said holding seat and said first segment of said barrel, and two screws respectively extending through said circular and elongated holes, and engaging threadedly said holding seat.

13. The optical instrument as claimed in claim 7, wherein said pivot seat of said second adjustment unit of said axis-adjustable optical device includes an extension segment extending from said support seat of said first adjustment unit in the third direction, and a suspension segment extending from said extension segment in the second direction and formed with an axle hole that extends in the first direction, said guide hoop including a hoop part, and an axle that extends from said hoop part in the first direction and that is received in said axle hole such that said hoop part is pivotable relative to said suspension segment.

14. The optical instrument as claimed in claim 13, wherein said guide hoop further includes a pivot ear projecting from said hoop part, said second adjustment unit of said axis-adjustable optical device further including a second biasing component disposed between said pivot ear and said extension segment of said pivot seat of said second adjustment unit, and a second screw fastener extending in the third direction sequentially through said pivot ear and said second biasing component, and engaging threadedly said extension segment.

* * * * *